Jan. 3, 1928.
E. A. ANDREWS
ANTISKID TIRE CHAIN
Filed June 16, 1926
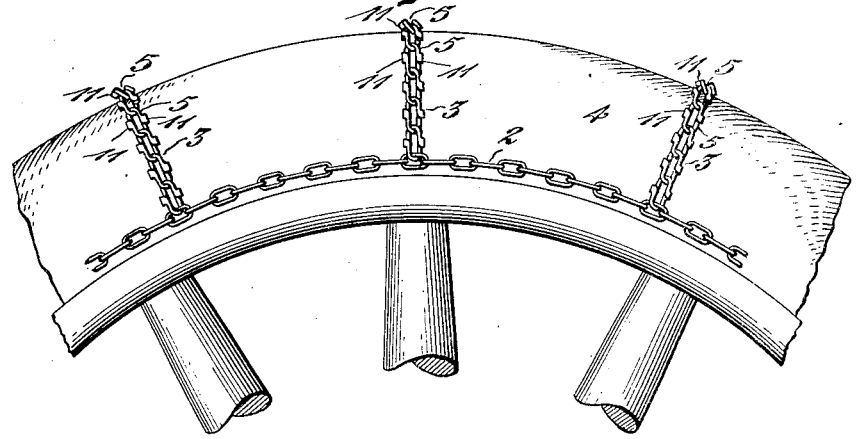
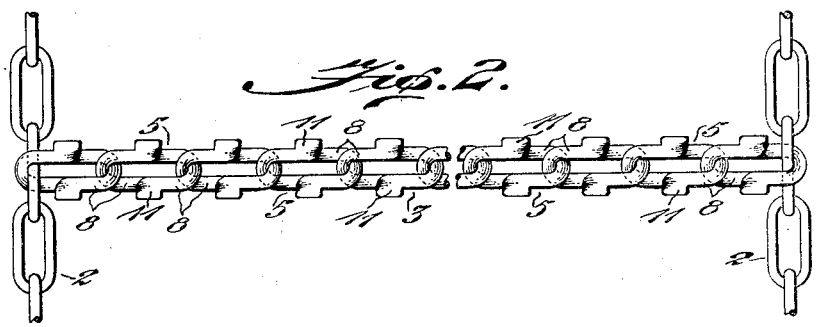
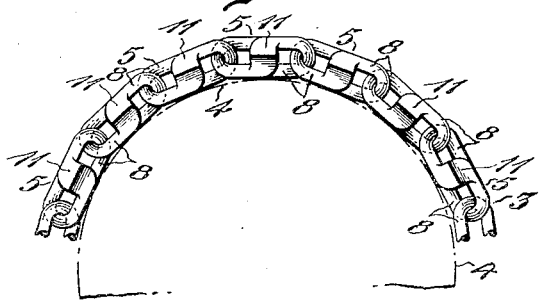
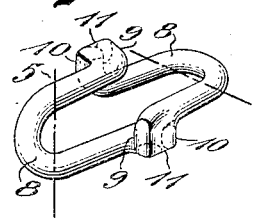
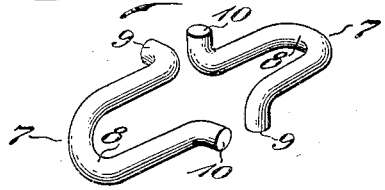

Patented Jan. 3, 1928.

1,655,122

UNITED STATES PATENT OFFICE.

EDWARD AUSTIN ANDREWS, OF NEWTON CENTER, MASSACHUSETTS.

ANTISKID TIRE CHAIN.

Application filed June 16, 1926. Serial No. 116,414.

This invention relates to anti-skid tire-chains for use on automobiles and other vehicles and consists of improvements in the construction of the cross-links which provide traction for the wheels and prevent side slipping or skidding.

A principal object of the invention is to provide a tire-chain having cross-links which will more effectually grip the roadway to frictionally resist the tendency to longitudinal and lateral slippage of the wheel.

Another object of the invention is to provide a tire-chain with cross-links of enlarged section at their points of contact on the roadway whereby they will present an increased wearing surface to render them more durable in use.

Another object of the invention is to provide a tire-chain in which the cross-links are adapted to fit more snugly and firmly against the tire to hold them from rolling so that they will grip the roadway more positively and with an extended contact thereon.

Further objects of the improvement are set forth in the following specification which describes a preferred embodiment of the invention as illustrated by the accompanying drawings. In the drawings:

Fig. 1 is a side view of a portion of the rim of a wheel having a pneumatic tire mounted thereon, and illustrating my improved anti-skid chain as applied thereto;

Fig. 2 is an enlarged plan view of one of the cross-chains, shown as connected to the longitudinal side-chains which hold them in place on the tire, and illustrating the construction and arrangement of the improved cross-links;

Fig. 3 is a side view of one of the cross-chains showing the manner in which the cross-links fit against the surface of the tire;

Fig. 4 is a further enlarged perspective view of one of the improved cross-links; and Fig. 5 is a similar view showing the two blanks from which the cross-links are constructed.

Referring to the drawings, my improved anti-skid chain is substantially the same in general construction as the common type of tire-chain now widely used for automobiles.
It comprises a pair of longitudinal side-chains 2 adapted to be stretched around the lateral walls of the tire 4, with a series of shorter cross-chains 3 extending therebetween to overlie the tread of the tire. Suitable hooks or clasps, not herein illustrated, are employed to fasten together the ends of the side-chains 2 and the cross-chains 3 are thus held spaced at intervals around the tire to provide the traction and gripping action necessary on wet pavements and muddy or icy roads.

As before noted, the present invention relates particularly to the traction-members or cross-links of the tire-chain and the details of their novel form and construction will next be described. Referring to Figs. 4 and 5, each cross-link 5 is preferably constructed in two parts which are brazed or welded together at the center of the link to form projecting lugs or spurs of enlarged cross-section which provide the gripping elements of the chain. The cross-links 5 may be constructed from suitable wire of round, square or polygonal cross-section and each link is constituted by two blanks 7, 7 of identical form, see Fig. 5. Each blank 7 consists of a relatively short length of wire bent into a U-shaped loop 8 with the opposite sides thereof terminating in hooks 9 and 10 which project in opposite directions at right-angles to the plane of the loop. The blanks 7 may be formed in suitable bending-dies which cut off the wire and bend it around anvils in the manner as well known in the chain-making art. In forming the length of cross-chain 3 from the blanks 7 the latter are looped together in pairs and the hooked ends 9 and 10 of one blank interlocked respectively with the oppositely-extending hooks 10 and 9 on the next blank of the series. It will be observed by reference to Figs. 4 and 5 that when the blanks are reversed in position and their hooked ends 9 and 10 interengaged the loops 8 will be disposed in two separate planes standing at right-angles to each other as indicated by the dot-and-dash lines in Fig. 4; this novel form of the link being designed for a purpose as later explained.

The hooked ends 9 and 10 of the blanks 7 are brazed or welded together to form the complete link as illustrated in Fig. 4, the preferred method of joining the blanks being by electrical welding which consolidates them into an infrangible unit. It will be noted by reference to Figs. 2 and 4, that when the hooks 9 and 10 of the blanks are welded together they form substantially square spurs or lugs 11 projecting from the opposite sides of the links 5. The lateral and longitudinal faces of the spurs or lugs 11 are preferably formed with sharp edges to provide an increased gripping effect under contact with the roadway; this formation being given to the links either when bending up the blanks or by mashing them together in dies during the welding operation.

Fig. 2 illustrates a series of the links 5 joined together in the cross-chain 3 with the end links thereof connected to the longitudinal side-chains 2. When the complete tire-chain is applied to the vehicle wheel the cross-chains 3 will extend laterally across the tread of the tire with their links 5 lying closely thereagainst. The links 5 bear against the surface of the tire in a peculiar manner to expose their spurs or lugs 11 for double contact with the ground or roadway. That is to say, the links 5 will assume a position with one straight side of the loop 8 at each end of the link resting against the tire so that the two looped parts of the link will lie in oppositely inclined planes with respect to the plane of the roadway with which the cross-chains contact, see Fig. 1. Stated another way, the cross-links 5 will make contact with the roadway during the travel of the wheel thereover with their looped end-portions inclined at an angle thereto so that the tendency will be to dig both of their spurs or lugs 11 into the ground to provide a positive gripping action thereon. It will be noted by reference to Fig. 3, however, that only the smooth, rounded sides of the links bear against the surface of the tire so that no undue wear is imposed thereon.

With the cross-chains 3 overlying the tread of the tire and their links 5 disposed in the arrangement as above explained the action of the chain is as follows: As the wheel rolls over the roadway the cross-chains 3 are successively carried into contact with the ground, a plurality of the cross-chains being constantly beneath the tread of the tire. As each cross-chain is brought down against the surface of the roadway the spurs 11 which stand out at the sides of the links 5 will be driven into the ground or roadbed to effect a strong grip thereon. This gripping action of the cross-chains is augmented by the inclination of the loops of the links in planes at right-angles to each other, and also due to the fact that the manner of their contact on the ground and against the tread of the tire prevents the links from rolling or slipping laterally. To employ a simile, the links rest on the ground, and also on the tire, much like a child's "jack-stone", with their legs crossed and inclined at an angle to the contact surface. Through this peculiar method of action the cross-chains are prevented from lateral rolling or slippage so that their hold on the roadway is more positive, giving better traction for the drive wheels of the vehicle and increased frictional resistance to sliding when the brakes are applied.

As another advantage of the improvement the sharp edges of the spurs or lugs 11 of the links 5 provide a further increased frictional grip on the roadway to prevent longitudinal sliding of the links when there is a tendency for the wheel to skid laterally. My improved tire-chain is therefore much more efficient in providing the maximum traction effect and increased resistance to side slip of the wheel under all conditions of use.

In addition to the above noted features, the present improved device also provides for longer wear of the cross-chains. It will be noted that the links 5 bear on the roadway along practically their whole length on opposite sides of their end loops 8. That is to say, one leg of each loop makes contact with the ground throughout its length. This is a marked improvement and gives greater traction than with the usual curbed chain, the links of which contact with the ground only at their centers. Moreover, the point of greatest wear at the longitudinal center of the link is reinforced and thickened to twice the ordinary cross-sectional area in the enlarged lugs 11. The life of the cross-chains is therefore more than doubled so that less frequent repair or replacement is necessary and the whole tire-chain is therefore much more durable in use.

While I have herein illustrated and described a preferred form of construction of the improved tire-chain and a convenient method of forming the links thereof, it is obvious that various modifications may be made in the details of construction which would fall within the spirit and scope of the invention.

Therefore, without limiting myself in this respect, I claim:

1. An improved cross-link for anti-skid tire-chains constructed with U-shaped end-loops having hooked ends joined together at the center of the link to provide lugs projecting from the sides thereof.

2. An improved cross-link for anti-skid tire-chains comprising U-shaped loops of wire having oppositely extending hooked ends welded together to form lugs of enlarged cross-sectional area on the sides of the link.

3. An improved link for anti-skid tire-chains having looped ends with the sides of one loop arranged in a plane at right-angles to the plane of the sides of the other loop, said loops meeting to form lugs which project from the sides of the link.

4. An improved cross-link for anti-skid tire-chains constructed from wire blanks bent into U-shaped loops terminating in hooks which project in opposite directions at right-angles to the plane of the loop, the hooks on the blanks being arranged in interlocking relation and welded together to form spur-like lugs projecting from the sides of the link.

5. An improved link for anti-skid tire-chains having opposite end-loops arranged in planes at substantially right-angles to each other, and a lug on each side of the link projecting at right-angles to the plane of each loop.

6. An improved link for anti-skid tire-chains comprising U-shaped end-loops disposed in planes at substantially right-angles to each other and meeting at the center of the link in portions extending at right-angles to the plane of each loop.

7. An improved link for anti-skid tire-chains comprising looped ends disposed in planes at substantially right-angles to each other and united at the center of the link by portions of enlarged cross-section having substantially flat surfaces extending at right angles to the plane of each loop.

In testimony whereof I affix my signature.

EDWARD AUSTIN ANDREWS.